United States Patent
Gaulmin et al.

(10) Patent No.: US 8,121,773 B2
(45) Date of Patent: Feb. 21, 2012

(54) METHOD AND AN INSTRUMENT FOR DETERMINING THE LIMITING PARAMETER OF A TURBOSHAFT ENGINE

(75) Inventors: François-Xavier Gaulmin, Salon de Provence (FR); Lionel Iraudo, Marseilles (FR)

(73) Assignee: Eurocopter, Marignane Cedex (FR)

( * ) Notice: Subject to any disclaimer, the term of this patent is extended or adjusted under 35 U.S.C. 154(b) by 1293 days.

(21) Appl. No.: 11/808,168

(22) Filed: Jun. 7, 2007

(65) Prior Publication Data

US 2008/0125931 A1   May 29, 2008

(30) Foreign Application Priority Data

Jun. 16, 2006 (FR) ...................................... 06 05384

(51) Int. Cl.
*G01M 15/00* (2006.01)
*G01M 15/02* (2006.01)
*G06F 19/00* (2011.01)

(52) U.S. Cl. ............ 701/100; 701/29; 701/3; 244/17.13
(58) Field of Classification Search ................ 701/9, 29, 701/100, 99, 35, 31, 30, 3; 702/41, 182, 702/130, 181, 183; 60/39.6; 244/17.13, 244/17.11, 75.1
See application file for complete search history.

(56) References Cited

U.S. PATENT DOCUMENTS

| 5,018,069 | A | 5/1991 | Pettigrew | |
|---|---|---|---|---|
| 7,149,657 | B2 * | 12/2006 | Goebel et al. | 702/183 |
| 7,197,430 | B2 * | 3/2007 | Jacques et al. | 702/184 |
| 7,702,447 | B2 * | 4/2010 | Volponi | 701/100 |
| 2002/0016654 | A1 | 2/2002 | Ing et al. | |
| 2005/0096873 | A1 * | 5/2005 | Klein | 702/184 |
| 2005/0171732 | A1 * | 8/2005 | Williams et al. | 702/182 |
| 2008/0097703 | A1 * | 4/2008 | Francois | 702/34 |

FOREIGN PATENT DOCUMENTS

| DE | 36 40 452 | 6/1988 |
|---|---|---|
| EP | 0 816 226 | 1/1998 |
| FR | 2 755 945 | 5/1998 |
| FR | 2 772 718 | 6/1999 |

\* cited by examiner

*Primary Examiner* — Thomas Black
*Assistant Examiner* — Christine Behncke
(74) *Attorney, Agent, or Firm* — Brooks Kushman P.C.

(57) ABSTRACT

The present invention relates to a method and to an instrument for determining the limiting margin of a surveillance parameter of a turboshaft engine. During a preliminary stage, a secondary processor means (11) determines a preliminary comfort margin. Thereafter, during a main stage, it estimates a useful comfort margin from the preliminary comfort margin, and then an apparent difference between the current value and the limit value of the surveillance parameter, and finally the limiting margin by subtracting the useful comfort margin from the apparent difference.

22 Claims, 1 Drawing Sheet

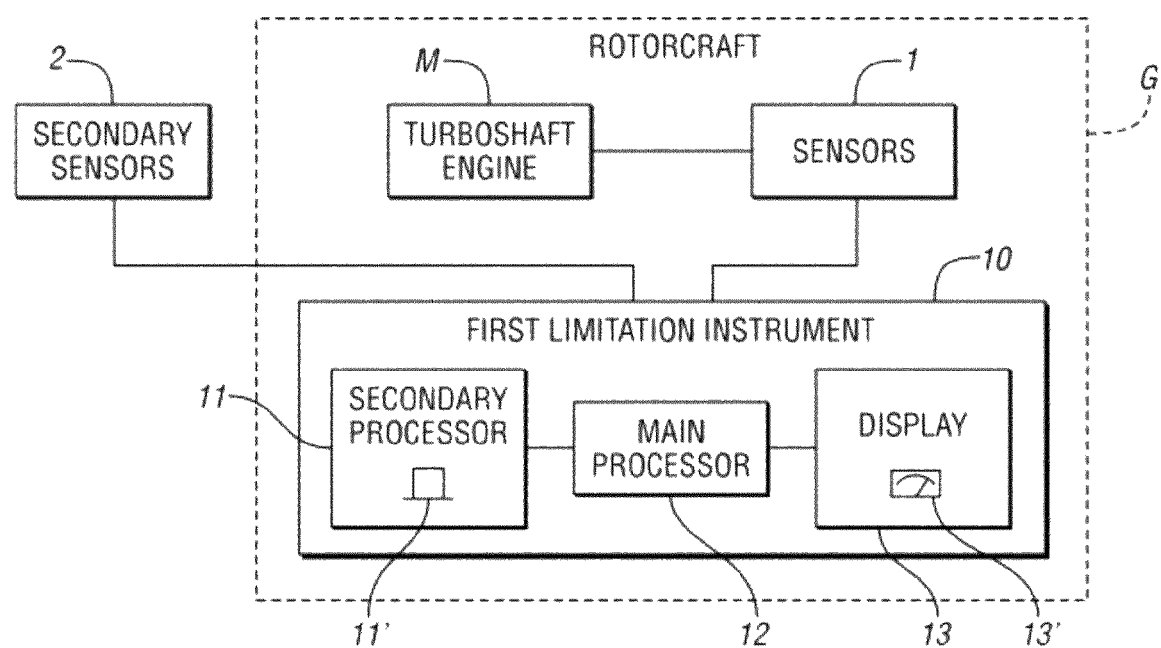

METHOD AND AN INSTRUMENT FOR DETERMINING THE LIMITING PARAMETER OF A TURBOSHAFT ENGINE

The present invention relates to a method and to an instrument, in particular a first limitation instrument, enabling the limiting parameter of a rotorcraft to be determined and displayed.

BACKGROUND OF THE INVENTION

A rotorcraft is piloted while monitoring numerous instruments on the instrument panel, most of which instruments are representative of the operation of the engine installation of the rotorcraft. For physical reasons, there exist numerous limitations that the pilot needs to take into account at each instant in flight. These various limitations depend generally on the stage of flight and on outside conditions.

Rotorcraft are generally provided with at least one turboshaft engine having a free turbine. Power is then taken from a low pressure stage of the free turbine which rotates in the range 20,000 revolutions per minute (rpm) to 50,000 rpm. Thereafter, a gearbox is needed to connect the free turbine to the main rotor for providing lift and propulsion since the speed of rotation of the rotor lies substantially in the range 200 rpm to 400 rpm: this is known as the main gearbox (MGB).

The thermal limitations of the engine and the torque limitations of the main gearbox serve to define three normal use ratings for a turboshaft engine:
- a takeoff rating that can be used for five to ten minutes, corresponding to a level of torque for the gearbox and to a level of heating for the engine that can be accepted for a limited length of time without significant damage: this is the maximum takeoff power (PMD);
- a maximum continuous rating such that the capacities of the main gearbox and those that result from the maximum heating that is acceptable on a continuous basis upstream of the high pressure blades of the first stage of the free turbine are not exceeded at any time: this is the maximum continuous power (PMC); and
- a maximum transient rating, set by regulation: this is known as the maximum transient power (PMT).

There also exist super contingency ratings for twin-engine rotorcraft that apply when one of the two engines fails:
- a super contingency rating during which the capabilities of the main gearbox on the inlet stages and the thermal capabilities of the turboshaft engine are used to the maximum: this is referred to as super emergency power (PSU), it can be used during 30 seconds consecutively at the most, and three times during a flight. If the PSU is used, then the turbine engine must be removed and overhauled;
- a super contingency rating during which the capabilities of the main gearbox on its inlet stages and the capabilities of the turboshaft engine are used very fully: this is referred to as maximum emergency power (PMU) that can be used for 2 minutes following PSU or for 2 minutes and 30 seconds consecutively at most, and
- a super contingency rating during which the capabilities of the main gearbox on the inlet stages and the thermal capabilities of the turboshaft engine are used without damage: this is referred to as intermediate emergency power (PIU) and it can be used for 30 minutes or continuously for the remainder of the flight after the turbine engine has broken down.

The engine manufacturer uses calculation and testing to draw up available power curves for a turboshaft engine as a function of altitude and outside temperature, and does so for each of the above-defined ratings.

In addition, the manufacturer determines the limitations of the turboshaft engine that make it possible to obtain a minimum power for each of the above-specified ratings and an acceptable lifetime, the minimum power corresponding in particular to the power developed by a turboshaft engine that is old, i.e. an engine that has reached its maximum lifetime. These limits are generally monitored by means of three surveillance parameters of the engine: the speed of rotation of the engine gas generator; the engine torque; and the ejection temperature of the gas at the inlet to the free turbine of the engine, which parameters are respectively known as Ng, Cm, and T45 to the person skilled in the art.

Document FR 2 749 545 discloses a piloting indicator that identifies amongst the surveillance parameters of the turboshaft engine, which parameter is closest to its limit. The information relating to the limitations to be complied with is thus grouped together on a single display, thereby making it possible firstly to obtain a summary and present only the result of the summary so as to simplify the task of the pilot, and secondly to save space on the instrument panel. This produces a "limiting parameter" amongst said surveillance parameters of the engine, i.e. the parameter whose current value is the closest to the corresponding limit value. That is why such an indicator is also referred to below as a first limitation indicator or "IPL".

Furthermore, variants of such an IPL serve to display the value of the limiting parameter as an equivalent power, i.e. in terms of a power margin such as +10% of PMD, for example, or else as a pitch margin, where pitch indicates the position of the rotor blades of the rotorcraft relative to the incident air flow.

Consequently, IPLs display the current value at a given instant of the limiting parameter and advantageously limit the number of instruments needed for monitoring a turboshaft engine, thereby greatly easing the work of the pilot.

Nevertheless, when the manufacturer does not select a surveillance parameter that is preferred for piloting, the manufacturer may establish fixed limitations for ratings under pilot control, i.e. takeoff and maximum continuous ratings, while the other ratings are managed with the help of stop values. Consequently, for each surveillance parameter, limit values are obtained that should not be exceeded providing the turboshaft engine is developing all of the power available for a given rating. For example, if the engine is developing 100% of TOP, then the surveillance parameters must not exceed their limit values, as set by the manufacturer for an engine operating at takeoff rating.

Throughout the flight envelope, the pilot must take care to avoid exceeding the prescribed limits concerning power, PMC or PMD depending on the rating in question, speed of rotation Ng of the gas generator, temperature T45, and the torque Cm of the turboshaft engine.

As a result, if operating conditions for a new turboshaft engine are taken into consideration, then the Ng margin or the T45 margin thereof serving in particular to determine the limiting parameter, is very likely to be high. Once converted into a power margin, it can be greater than the power margin that is genuinely available and can induce the pilot to make an error. If the pilot were to make use of all of the displayed margin, that would go beyond the authorized power limit and would damage the engine severely. This leads to multiple consequences, but it will readily be understood for example that the lifetime of the engine is therefore reduced, which leads to high maintenance cost for the user.

OBJECTS AND SUMMARY OF THE INVENTION

An object of the present invention is to propose a method of determining the margins available for a rotorcraft surveillance parameter and also to provide an active "first limitation" instrument implementing said method and serving to display the above-mentioned IPL limitations as to avoid displaying a power margin that is greater than the margin that the turboshaft engine can deliver without damage.

According to the invention, a method of determining the limiting margin between the current value and the limit value set by the manufacturer of a surveillance parameter for a turboshaft engine operating at a given speed, the surveillance parameter reaching a guaranteed value when the engine is old, is remarkable in that the following steps are performed:

a) during a preliminary stage, determining a preliminary comfort margin from a real difference equal to said current value minus the guaranteed value of the engine surveillance parameter; and b) during a main stage:

b1) determining a useful comfort margin from said preliminary comfort margin;

b2) determining the apparent difference between the current value and the limit value of said surveillance parameter; and b3) determining said limiting margin by subtracting the useful comfort margin from the apparent difference.

As a function of the nature of the surveillance parameter, the guaranteed value corresponds:

when the surveillance parameter is the speed of rotation of the gas generator of the engine, to the value that this speed of rotation would reach if the engine were an old engine;

when the surveillance parameter is the ejection temperature of the gas at the inlet to the free turbine of the engine, to the value that this temperature would reach if the engine were an old engine; and when the surveillance parameter is the torque of the engine, to the limit value of said torque at the operating speed of the engine.

The main stage is performed continuously while the rotorcraft is in flight, when the limiting margin is, for example, used by a first limitation instrument.

In contrast, the preliminary stage is implemented solely when spot checks are made on the soundness of engines. Soundness checks are generally recommended by the manufacturer in order to verify periodically that the performance of the turboshaft engine is better than or equal to the required performance level. Thus, the real difference can be clearly determined during such checks.

Consequently, the method serves to define the limiting margin of a surveillance parameter without running the risk of overestimating it, and in particular without giving the pilot the idea that a power margin is available that is not representative of reality. The limiting margin in the end is mainly determined as a function of the guaranteed values for the surveillance parameters of the turboshaft engine and not as a function of the limit values, which can under certain circumstances be greater than the real capability of the engine.

In a first implementation, the preliminary comfort margin is equal to said real difference, the useful comfort margin then being equal to the preliminary comfort margin.

In a second implementation, the preliminary comfort margin is equal to the modulated difference. During step a), a transfer relationship is used to modulate the real difference as a function of outside conditions, namely the outside temperature or even the outside pressure depending on the surveillance parameter under consideration, so as to obtain said modulated difference.

Outside conditions have an influence on the surveillance parameters. In order to obtain good accuracy, it is therefore advantageous to operate always in the same frame of reference, referred to as "ISA sea level" by the person skilled in the art, by modulating the real difference determined during a soundness check.

When the surveillance parameter is the speed of rotation of the gas generator of the turboshaft engine, the transfer relationship is the following first relationship in which "*" represents the multiplication symbol and $\Delta NG'$, $\Delta NG$, and T0 represent respectively the modulated difference, the real difference between the current value and the guaranteed value of the speed of rotation, and the temperature outside the rotorcraft in degrees Kelvin:

$$\Delta NG' = \Delta NG * \sqrt{\frac{288}{T0}}$$

When the surveillance parameter is the ejection temperature of gas at the inlet to the free turbine as developed by said turboshaft engine, said transfer relationship is the following second relationship in which "*" represents the multiplication symbol and $\Delta T'$, $\Delta T$, T0, and P0 represent respectively the modulated difference, the real difference between the current value and the guaranteed value of the ejection temperature, and the outside temperature (in degrees Kelvin) and the pressure (in millibars) outside the rotorcraft:

$$\Delta T' = \Delta T * \left( \left( \frac{1013.25}{P0} \right)^{\beta 1} * \left( \frac{288.15}{T0} \right)^{\beta 2} \right)$$

β1 and β2 depending on the engine concerned and generally lying in the range −1 to +1.

Finally, when the surveillance parameter is the torque developed by said turboshaft engine, said transfer relationship is the following third relationship in which "*" represents the multiplication symbol and $\Delta C'$, $\Delta C$, T0, and P0 represent respectively the modulated difference, the real difference between the current value and the guaranteed value for said torque, and the temperature (in degrees Kelvin) and the pressure (in millibars) outside the rotorcraft:

$$\Delta C' = \Delta C * \left( \left( \frac{1013.25}{P0} \right)^{\alpha 1} * \left( \frac{288.15}{T0} \right)^{\alpha 2} \right)$$

where α1 and α2 depend on the engine concerned and generally lie in the range −1 to 1.

Nevertheless, with reference to a variation of these two implementations, the real comfort margin is estimated using a moving average adding the modulated or real differences determined over the most recent preliminary stages under consideration, preferably five to fifteen of them, and then dividing the resulting sum by the number of preliminary stages taken into consideration. The preliminary comfort margin is thus equal to the moving average of the modulated or real difference, depending on the implementation.

This variant is particularly advantageous since it attenuates the consequences of a soundness check giving poor results as a result of particular conditions or of a measurement sensor failing, for example. The determination of the limiting margin of a surveillance parameter and the safety that stems therefrom are therefore improved.

Furthermore, if this variant is applied to the second implementation, with the preliminary comfort margin being in fact determined by using a modulated difference, then during step b1) of the main stage, the useful comfort margin is estimated by replacing the preliminary comfort margin under the conditions of flight of the rotorcraft, and not under "ISA sea level" conditions when implementing said transfer relationship. This performs a kind of "demodulation", following the modulation implemented during the preliminary stage, so as to take into consideration the real outside conditions, with the useful comfort margin then depending on those outside conditions.

Under such conditions, where "Mu" is the useful comfort margin and "Mp" is the preliminary comfort margin, the first, second, and third above-mentioned relationships are used as a function of the corresponding surveillance parameter, by:
  replacing $\Delta NG'$ and $\Delta NG$ by Mp and Mu in the first relationship when the surveillance parameter is the speed of rotation of the gas generator;
  replacing $\Delta T'$ and $\Delta T$ by Mp and Mu in the second relationship when the surveillance parameter is the ejection temperature of the gas at the inlet to the free turbine of the engine; and
  replacing $\Delta C'$ and $\Delta C$ by Mp and Mu in the first relationship when the surveillance parameter is the torque of the engine.

Furthermore, the present invention also provides a first limitation instrument for a rotorcraft provided with at least one turboshaft engine, said instrument comprising firstly acquisition sensors for acquiring the current values of a plurality of surveillance parameters of said engine, and secondly main processor means for determining a limiting parameter, namely the surveillance parameter having the smallest limiting margin, said instrument being provided with display means presenting the display value of said limiting parameter on a display screen.

This instrument further includes secondary processor means, optionally integrated in the main processor means in order to implement the method of the invention so that:
  a) during a preliminary stage, determining, for each surveillance parameter, a preliminary comfort margin from a real difference equal to said current value minus said guaranteed value; and
  b) during a main stage, determining in succession:
  b1) a useful comfort margin from said preliminary comfort margin;
  b2) the apparent difference between the current value and the limit value of said surveillance parameter; and
  b3) said limiting margin by subtracting the useful comfort margin from the apparent difference.

In order to perform the second implementation of the above method, the instrument is provided with secondary sensors measuring outside conditions, namely the outside pressure and temperature in order in particular to ensure that the secondary processor means determine a modulated difference of said real difference as a function of outside conditions.

Furthermore, the secondary processor means are advantageously provided with a memory suitable for storing the most recently determined modulated or real differences in order to take a moving average thereof in accordance with the above-specified variants of those implementations of the method.

In addition, the display value corresponds to the current value of the limiting parameter, e.g. converted into a power margin or a pitch margin by the main processor means.

BRIEF DESCRIPTION OF THE DRAWING

The invention and its advantages appear in greater detail in the context of the following description which shows preferred embodiments, given without any limiting character, and with reference to the sole accompanying FIGURE that is a diagrammatic view of a first limitation instrument.

The sole FIGURE shows the first limitation instrument 10 of the invention arranged on a rotorcraft G provided with a turboshaft engine M.

MORE DETAILED DESCRIPTION

The instrument 10 comprises secondary processor means 11, main processor means 12, and display means 13 suitable for displaying on a display screen 13' the display value of a surveillance parameter of the turboshaft engine M.

In addition, the device includes acquisition sensors 1 for acquiring the current values of surveillance parameters.

Finally, depending on the selected variant and embodiment, the instrument 10 is provided with secondary sensors 2 measuring the temperature T0 and the pressure P0 outside the rotorcraft. In addition, the secondary processor means 11, possibly integrated in the main processor means 12, are advantageously provided with a memory 11'.

The first limitation instrument 10 implements the method of the invention. During a preliminary stage, it is capable of checking the soundness of the turboshaft engine in order to compare the performance of the turboshaft engine M at the time of the check with the minimum performance that is guaranteed for said engine.

By way of example, in order to perform this preliminary stage, the pilot of the rotorcraft will set the engine on a given value of an engine piloting parameter, specifically the power or the speed of rotation of the gas generator, depending on the type of turboshaft engine. The secondary processor means 11 then measures the current values of the surveillance parameters of the engine via the acquisition sensors 1. The secondary processor means 11 then makes use of its memory 11' to determine the corresponding guaranteed values that are guaranteed for the surveillance parameters, i.e. the values that these parameters will reach for the above-mentioned given value of the piloting parameter on an old engine. More precisely, as a function of the nature of the surveillance parameter, the guaranteed value corresponds:
  when the surveillance parameter is the speed of rotation of the gas generator of the turboshaft engine, to the value that would be reached by this speed of rotation if the engine were an old engine;
  when the surveillance parameter is the temperature at which gas is ejected into the inlet of the free turbine of the turboshaft engine, to the value that would be reached by said temperature if the engine were an old engine; or
  when the surveillance parameter is the torque from the engine, to the limit value of said torque at the operating speed of the engine.

Thereafter, the secondary treatment means 11 performs steps a) of the method by determining, for each surveillance parameter, a real difference that is equal to the current value of the surveillance parameter minus its guaranteed value. This step thus presents the advantage of taking into consideration losses due to the engine being mounted, e.g. due to head losses in the air inlets of the engines or indeed to pressure distortions or even to the nozzles, insofar as the step is performed on board the rotorcraft.

Starting from this real difference, the secondary processor means 11 determines a preliminary comfort margin making it possible in the end to reset the current values of the surveillance parameters in order to make them substantially equal to the guaranteed values in order to ensure that the limiting margin of the limiting parameter, as will be estimated finally by the first limitation instrument 10, is not greater than the margin that is actually available.

In a first implementation, the secondary processor means 11 estimate that the preliminary comfort margin determined during the preliminary stage is equal to said real difference.

In a second implementation, seeking to be unaffected by outside conditions that do indeed influence the values of the surveillance parameters of the engine, the secondary processor means 11 modulate, i.e. "reduce" in the jargon of the art, the real difference as a function of outside conditions using a transfer relationship in order to obtain a modulated difference. The secondary processor means 11 then makes use of the information coming from the secondary sensors 2 delivering outside pressure P0 and temperature T0.

When the surveillance parameter is the speed of rotation of the gas generator of the turboshaft engine, the transfer relationship is the following first relationship in which "*" represents the multiplication symbol and $\Delta NG'$, $\Delta NG$, and $T0$ represent respectively the modulated difference, the real difference between the current value and the guaranteed value of said speed of rotation, and the temperature outside the rotorcraft:

$$\Delta NG' = \Delta NG * \sqrt{\frac{288}{T0}}$$

If the surveillance parameter is the temperature at which gas is ejected into the inlet of the free turbine as developed in said engine, the transfer relationship is the following second relationship in which "*" represents the multiplication symbol and $\Delta T'$, $\Delta T$, $T0$, and $P0$ represent respectively the modulated difference, the real difference between the current value and the guaranteed value for said ejection temperature, and the temperature and the pressure outside the rotorcraft:

$$\Delta T' = \Delta T * \left( \left( \frac{1013.25}{P0} \right)^{\beta 1} * \left( \frac{288.15}{T0} \right)^{\beta 2} \right)$$

where $\beta 1$ and $\beta 2$ depend on the engine in question and generally lie in the range $-1$ to $+1$.

Finally, when the surveillance parameter is the torque developed by said engine, said transfer relationship is the following third relationship in which "*" represents the multiplication symbol and $\Delta C'$, $\Delta C$, $T0$, and $P0$ represent respectively the modulated difference, the real difference between the current value and the guaranteed value of said torque, and the temperature and the pressure outside the rotorcraft:

$$\Delta C' = \Delta C * \left( \left( \frac{1013.25}{P0} \right)^{\alpha 1} * \left( \frac{288.15}{T0} \right)^{\alpha 2} \right)$$

where $\alpha 1$ and $\alpha 2$ depend on the engine in question and generally lie in the range $-1$ to $+1$.

Consequently, in the second implementation, the comfort margin is equal to the modulated difference, obtained from the real difference. The preliminary comfort margin then depends solely on the engine and not on outside conditions, thereby maximizing the accuracy of the device.

The preliminary stage is advantageously implemented during special flights serving to check soundness under the best possible conditions, and always for the same operating points, so as to achieve good accuracy and good repeatability for the method.

In a variant of the invention, the preliminary comfort margin is estimated by the secondary processor means 11 using a moving average. It is possible that particular events or conditions disturb a soundness check, and that the preliminary comfort margin thus departs from its real value.

The use of a moving average over the five to fifteen most recent soundness checks then becomes very useful in very greatly minimizing the impact of events of that type.

Thereafter, the secondary processor means 11 evaluates the preliminary comfort margin by adding the modulated or real differences, depending on the implementation, and as determined during the most recent preliminary stages, and then by dividing the resulting sum by the number of preliminary stages taken into consideration. To do this, the processor means 11 makes use in particular of a memory 11' storing the most recent real differences or calculated modulated differences.

Continuously throughout all of the flights, and using the preliminary comfort margin as estimated during spot checks on soundness as established for each surveillance parameter, the first limitation instrument 10 displays the display value of a limiting parameter, i.e. the surveillance parameter that is closest to its limit, i.e. for which the limiting margin is the smallest.

The main processor means 12 thus begins by determining a useful comfort margin from the preliminary comfort margin for each surveillance parameter.

In the first implementation, these two margins are equal.

This does not apply to the second implementation. It is shown above that the real difference leading to the preliminary comfort margin was reduced via a transfer relationship in order to avoid taking outside conditions into account. However, in flight, it is important to take outside temperature and pressure into consideration, since they influence the performance of the engine.

During step b1) of the method, the main processor means 12 therefore "demodulate" the preliminary comfort margin, i.e. they perform an operation opposite to the above-mentioned modulation, in order to obtain a useful comfort margin that takes account of outside conditions as measured by the secondary sensors 2, and using the above-mentioned transfer relationships.

Step b2) of the method then begins, the main processor means determining, for each surveillance parameter, the apparent difference between its current value and its limit value. The current values of all of the surveillance parameters are provided by the acquisition sensors 1, unlike their limit values. The processor means make use of preprogrammed curves or data tables in order to determine the limit value of a surveillance parameter on the basis of the current value of the turboshaft piloting parameter, this piloting parameter also being one of the surveillance parameters.

Finally, the main processor means 12 evaluate the limiting margin of each surveillance parameter by subtracting the useful comfort margin from the apparent difference.

The main processor means 12 can thus determine the limiting parameter, i.e. the surveillance parameter that is closest to its limits, and can display its display value on a display screen 13' of the display means 13.

This display value may be the current value or it may be the limiting margin of the surveillance parameter, possibly converted into a power margin or a pitch margin.

Naturally, the present invention can be subjected to numerous variations concerning its implementation. Although several implementations are described above, it will be readily understood that it is not conceivable to identify exhaustively all possible implementations. It is naturally possible to envisage replacing any means described by equivalent means without going beyond the ambit of the present invention.

What is claimed is:

1. A method for a rotorcraft provided with a turboshaft engine having a surveillance parameter, wherein the surveillance parameter has a guaranteed minimum value at a given engine operating condition when the engine is old, the method comprising:
   a) during a preliminary stage, operating the engine at the given engine operating condition, monitoring the engine to obtain a current value of the surveillance parameter, and determining a preliminary comfort margin from a real difference equal to said current value during the preliminary stage minus said guaranteed value; and
   b) during a main stage, operating the engine and monitoring the engine to obtain a current value of the surveillance parameter, wherein the surveillance parameter has a limit value depending on the operation of the engine; and
   b1) determining a useful comfort margin from said preliminary comfort margin;
   b2) determining an apparent difference equal to the difference between the current value during the main stage and the limit value of said surveillance parameter; and
   b3) determining a limiting margin as being equal to the useful comfort margin subtracted from the apparent difference.

2. A method according to claim 1, wherein said main stage is performed continuously while said rotorcraft is in flight.

3. A method according to claim 1, wherein said preliminary stage is implemented solely when performing spot checks on the soundness of the engine.

4. A method according to claim 1, wherein said preliminary comfort margin is equal to said real difference, said useful comfort margin being equal to said preliminary comfort margin.

5. A method according to claim 1, wherein said preliminary comfort margin is estimated with a moving average by adding the real differences determined during the most recent preliminary stages and then dividing the resulting sum by the number of preliminary stages taken into consideration.

6. A method according to claim 5, wherein said number of preliminary stages taken into consideration lies in the range five to fifteen.

7. A method according to claim 1, wherein during step a), a transfer relationship is used to modulate said real difference as a function of conditions outside of the rotorcraft in order to obtain a modulated difference.

8. A method according to claim 7, wherein when the surveillance parameter is the speed of rotation of the gas generator of said turboshaft engine, said transfer relationship is the following first relationship in which "*" represents the multiplication symbol and $\Delta NG'$, $\Delta NG$, and $T0$ represent respectively the modulated difference, the real difference between the current value and the guaranteed minimum value for said speed of rotation, and the temperature outside the rotorcraft:

$$\Delta NG' = \Delta NG * \sqrt{\frac{288}{T0}}$$

9. A method according to claim 7, wherein when the surveillance parameter is the ejection temperature of the gas at the inlet to the free turbine as developed by said turboshaft engine, said transfer relationship is the following second relationship in which "*" represents the multiplication symbol and $\Delta T'$, $\Delta T$, $T0$, and $P0$ represent respectively the modulated difference, the real difference between the current value and the guaranteed value of said ejection temperature, and the temperature and the pressure outside the rotorcraft:

$$\Delta T' = \Delta T * \left( \left( \frac{1013.25}{P0} \right)^{\beta 1} * \left( \frac{288.15}{T0} \right)^{\beta 2} \right)$$

10. A method according to claim 7, wherein when the surveillance parameter is torque developed by said turboshaft engine, said transfer relationship is the following third relationship in which "*" represents the multiplication symbol and $\Delta C'$, $\Delta C$, $T0$, and $P0$ represent respectively the modulated difference, the real difference between the current value and the guaranteed minimum value of said torque, and the temperature and the pressure outside the rotorcraft:

$$\Delta C' = \Delta C * \left( \left( \frac{1013.25}{P0} \right)^{\alpha 1} * \left( \frac{288.15}{T0} \right)^{\alpha 2} \right)$$

11. A method according to claim 7, wherein said preliminary comfort margin is equal to said modulated difference.

12. A method according to claim 7, wherein the preliminary comfort margin is estimated using a moving average, adding the modulated differences determined during the most recent preliminary stages and dividing the resulting sum by the number of preliminary stages taken into consideration.

13. A method according to claim 7, wherein when the preliminary comfort margin is determined by a modulated difference, during step b1), the useful comfort margin is estimated by replacing the preliminary comfort margin in the flying conditions of the rotorcraft using said transfer relationship.

14. A method according to claim 1, wherein when the surveillance parameter is the speed of rotation of the gas generator of the turboshaft engine, said guaranteed minimum value corresponds to the value that would be reached by said speed of rotation if the engine were an old engine.

15. A method according to claim 1, wherein when the surveillance parameter is the ejection temperature of the gas at the inlet to the free turbine of the turboshaft engine, said guaranteed minimum value corresponds to the value that said temperature would reach if the engine were an old engine.

16. A method according to claim 1, wherein when the surveillance parameter is the torque of the turboshaft engine, said guaranteed minimum value corresponds to the limit value of said torque at the operating speed of the engine.

17. A first limitation instrument for a rotorcraft provided with at least one turboshaft engine, said instrument comprising:

acquisition sensors for acquiring current values of a plurality of surveillance parameters of said engine, wherein each surveillance parameter has a guaranteed minimum value at a given engine operating condition when the engine is old; and a processor configured to:

a) during a preliminary stage while the engine is operating at the given engine operating condition, obtain from the sensors the current values of the surveillance parameters and, for each surveillance parameter, determine a preliminary comfort margin from a real difference equal to said current value during the preliminary stage minus said guaranteed value; and b) during a main stage while the engine is operating, obtain from the sensors the current values of the surveillance parameters, wherein each surveillance parameter has a limit value depending on the operation of the engine, and, for each surveillance parameter, determine in succession:

b1) a useful comfort margin from said preliminary comfort margin;

b2) an apparent difference equal to the difference between the current value during the main stage and the limit value of said surveillance parameter; and b3) a limiting margin as being equal to the useful comfort margin subtracted from the apparent difference.

18. A first limitation instrument according to claim 17, wherein said processor includes a secondary processor integrated in a main processor.

19. A first limitation instrument according to claim 17, including secondary sensors measuring outside conditions in order to ensure that the processor determines a modulated difference of said real difference as a function of the outside conditions.

20. A first limitation instrument according to claim 19, wherein said processor is provided with a memory suitable for storing the most recently determined modulated differences in order to take a moving average thereof.

21. A first limitation instrument according to claim 17, further comprising a display configured to display the value of said limiting margin.

22. A first limitation instrument according to claim 21, wherein said display value corresponds to said limiting margin of said limiting parameter converted into one of a power margin and a pitch margin.

* * * * *